(12) United States Patent
Sophrin

(10) Patent No.: US 8,933,990 B2
(45) Date of Patent: Jan. 13, 2015

(54) METHOD FOR 3D VISUAL MAPPING USING 3D STEREOSCOPIC VIDEO CONTENT

(76) Inventor: Joshua Sophrin, New York, NY (US)

( * ) Notice: Subject to any disclaimer, the term of this patent is extended or adjusted under 35 U.S.C. 154(b) by 373 days.

(21) Appl. No.: 13/584,669

(22) Filed: Aug. 13, 2012

(65) Prior Publication Data
US 2013/0044184 A1 Feb. 21, 2013

Related U.S. Application Data

(60) Provisional application No. 61/523,806, filed on Aug. 15, 2011.

(51) Int. Cl.
H04N 13/04 (2006.01)
H04N 9/31 (2006.01)

(52) U.S. Cl.
CPC .......... *H04N 9/3147* (2013.01); *H04N 9/3185* (2013.01); *H04N 9/3194* (2013.01)
USPC .............................................. 348/43; 348/42

(58) Field of Classification Search
USPC .............. 348/42, 43, 51, 47, 48, 52; 359/462; 396/324, 325; 382/154, 285; 345/419, 345/626, 672, 679, 680
IPC .................................. H04N 13/00,13/02, 13/04
See application file for complete search history.

(56) References Cited

U.S. PATENT DOCUMENTS

| | | | |
|---|---|---|---|
| 5,384,912 A | 1/1995 | Ogrinc et al. | |
| 5,649,171 A | 7/1997 | Craven et al. | |
| 7,200,262 B2 | 4/2007 | Sawada | |
| 8,208,719 B2 * | 6/2012 | Gordon et al. | 382/154 |
| 2006/0204076 A1 | 9/2006 | Avinash et al. | |

* cited by examiner

Primary Examiner — Sherrie Hsia
(74) Attorney, Agent, or Firm — Richard C Litman

(57) ABSTRACT

The method for 3D visual mapping using 3D stereoscopic video content records live 2D perspective white images mapped to architectural or other 3D objects having abstract shaped surfaces to create 2D perspective masks fitting the surface shapes. Each abstract surface area is covered by a dedicated projector and controller. The mapping is locked into place on a pixel grid, the project being logically recorded-rendered onto a hard drive at native resolution to produce a 2D master mask, which is separated into sub-masks determined by the individual areas of the 2D master mask. Each 2D sub-mask is applied as a video layer and used to mask areas around 3D stereoscopic video content in its timeline. The 2D masked-mapped stereoscopic 3D video can be played on 3D stereoscopic projectors. A common clock synchronizes the processors for playback of the 3D content on the 3D surface areas.

9 Claims, 7 Drawing Sheets

METHOD FOR 3D VISUAL MAPPING USING 3D STEREOSCOPIC VIDEO CONTENT

CROSS-REFERENCE TO RELATED APPLICATION

This application claims the benefit of U.S. Provisional Patent Application Ser. No. 61/523,806, filed Aug. 15, 2011.

BACKGROUND OF THE INVENTION

1. Field of the Invention

The present invention relates to 3D image projection, and particularly to a method for 3D visual mapping using 3D stereoscopic video content that projects 2D-mapped 3D images on to architectural or other 3D surfaces.

2. Description of the Related Art

Projection mapping is the accurate alignment of projected images with architectural features of buildings, stage sets, or other 3 dimensional (3D) objects. Projection mapping onto buildings is done by the use of high-power projectors. Video jockeys (VJs) are experimenting with actual real 3D objects and mapping projected video images onto the actual 3D objects, This process is called 3D projection mapping, For example, using MODUL8 as the mixer-compositor and a projector, an image can be projected onto a 3D surface. The VJ selects a still image to project in the direction of the actual 3D objects. Then, in the filters menu, the VJ selects perspective transform where the corners of the image can be stretched or compressed, thereby changing the image perspective of the still image until the image perfectly matches the dimensions and perspective of a surface of the 3D object. This process is called masking.

Once the still image has been matched to the 3D object surface, i.e., masks the 3D object surface, a video using the same mask parameters can be substituted for the still image and then played on the surface of the 3D object. MODUL8 can independently control more than one projector. So within the limitations of the MODUL8 software, this process can be repeated for the number of surfaces that the 3D object has. However, 3D projection mapping has its limitations.

Thus, a method for 3D visual mapping using 3D stereoscopic video content solving the aforementioned problems is desired.

SUMMARY OF THE INVENTION

The method for 3D visual mapping using 3D stereoscopic video content includes recording a live recorded-rendered 2D perspective white image that is mapped to an architectural or other 3D object having a number of abstract shaped surface areas to create a 2D perspective mask fitting the architectural structure or other 3D object. The abstract surface areas are covered by as many projectors as the number of abstract shaped surface areas, the projectors being under computer control.

Once all of the mapping is locked into place on an XY pixel grid, the entire project is logically recorded and then logically rendered onto a hard drive at a native resolution to produce a 2D master mask. The 2D master mask is then separated into sub-masks determined by the individual surface areas of the 2D master mask. Each 2D sub-mask is then applied as a video layer and used to mask areas around 3D stereoscopic video content in its timeline. This 2D masked-mapped stereoscopic 3D video content is then played on 3D stereoscopic projectors. A dedicated processor controls each projector, which is dedicated to projecting one of the originally defined 3D object surface areas. The dedicated processors are synchronized by a common clock for playback synchronization of the 3D content on the 3D abstract surface areas.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The method for 3D visual mapping using 3D stereoscopic video content includes recording a live-rendered 2D perspective white image while mapping the white image to an architectural or other 3D object having a number of abstract shaped surface areas to create a 2D perspective mask fitting the architectural structure or other 3D object. The abstract surface areas are covered by as many projectors as the number of abstract shaped surface areas, the projectors being under computer control.

The mapping is locked into place on an XY pixel grid, and then the entire project is logically recorded-rendered onto a hard drive at a native resolution to produce a 2D master mask. The 2D master mask is separated into sub-masks determined by the individual surface areas of the 2D master mask. Each 2D sub-mask is then applied as a video layer and used to mask areas around 3D stereoscopic video content in its timeline. This 2D masked-mapped stereoscopic 3D video content is then played on 3D stereoscopic projectors. For each projector, there is a corresponding processor that controls it, the projector being responsible for projecting onto one of the originally defined 3D object surface areas. The processors are synchronized by a common clock for playback synchronization of the 3D content on the 3D abstract surface areas.

Figure 1:
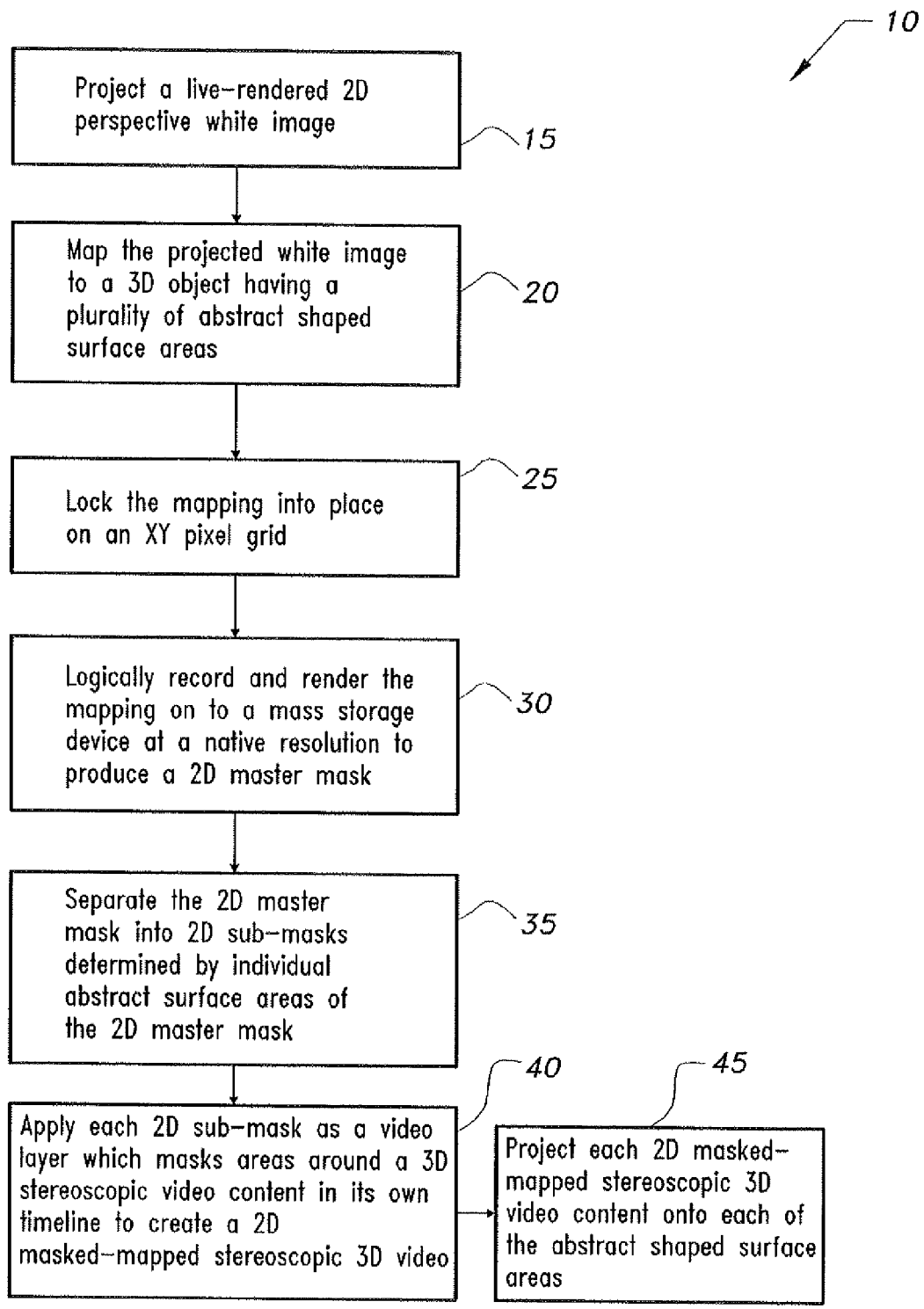
FIG. 1 is a flowchart detailing the steps in a method for 3D visual mapping using 3D stereoscopic video content according to the present invention.

The method, schematically rendered in the flowchart 10 of FIG. 1, utilizes Modul8 software (developed by a company called Garage Cube of Geneva, Switzerland), which is a Mac OS X application designed for real time video mixing and compositing (Mac is short for Macintosh®, a line of computers made by Apple, Inc. of Cupertino, Calif.). The Modul8 (2D) software application is used for masking architectural and other 31) features. Soft Cut Pro (or Final Cut Pro, a software application developed by Macromedia, Inc. and then by Apple, Inc.) is then used to fill in the 3D images. The images can then be played back on 3D stereographic projectors. Alternatively, individual laser projectors are provided to paint the image onto surfaces with a laser in bursts of pixels sweeping back and forth. This alternative setup potentially could eliminate the need to focus a lens on each projection surface. In the laser projection configuration, during animation, the image would stay sharply focused as it moves from one disparate surface to another at different distances from the projector without needing to focus the projector.

Modul8 is a video jockey (VJ)/live performance tool that is used for real time video mixing and compositing. The software provides a real time user interface that is designed for real time video performance. Based on a layer metaphor found in many common graphics editing software applications, Modul8 allows for intuitive real time video composition. Each change can be seen immediately in the composition, making the tool the ideal software for spontaneous improvisational creativity, interactive installations, or live performances. All main functions are available on one single panel for optimal accessibility. Up to ten different layers can be configured, each layer containing its own settings, effects, and media. The layers can be mixed together with progressive transparency. The layers can be moved, copied or re-ordered.

Linking is done automatically simply by clicking on the user-interface element and pressing the key. Layers can be split in two groups (A/B) and cross-faded from one group to another.

The Modul8 editing software can scale, translate and rotate the 2D masking images. The present method utilizes this capability of the Modul8 software. Movies can be mapped on a three-dimensional patch and transformations cab be applied, such as displacement mapping and reshape (sphere, cylinder), including several fill modes like wire frame or points. The present method also uses the per-layer logical record capability of Modul8, thereby allowing the recording and replay of per-layer user actions. Global logical recording lets the user record hours of mix at no CPU and disk space cost. The logical record can be rendered to a QuickTime® (QuickTime is a registered trademark of Apple Computer, Inc. of Cupertino, Calif.) movie. Direct capture mode allows rendering to a QuickTime® movie during the mixing process.

A special filter module supports per parameter animation. A mask mechanism can be used to apply a media as a mask in front of a composition.

FIG. 1 shows the process flow of the present method, irrespective of a particular software brand used. The method begins with step 15 that projects a live-rendered 2D perspective white image. Next, at step 20, the projected white image is mapped to a 3D object having a plurality of abstract shaped surface areas. Subsequently, at step 25, the mapping is locked into place on an XY pixel grid. At step 30, the mapping is logically recorded and rendered onto a mass storage device at a native resolution to produce a 2D master mask. Step 35 provides for separating the 2D master mask into 2D sub-masks determined by individual abstract surface areas of the 2D master mask. At step 40, each 2D sub-mask is applied as a video layer, which masks areas around a 3D stereoscopic video in its own timeline. This step creates a 2D masked-mapped stereoscopic 3D video. Step 45 utilizes projection machinery to project each 2D masked-mapped stereoscopic 3D video onto each of the abstract shaped surface areas.

Figure 2:
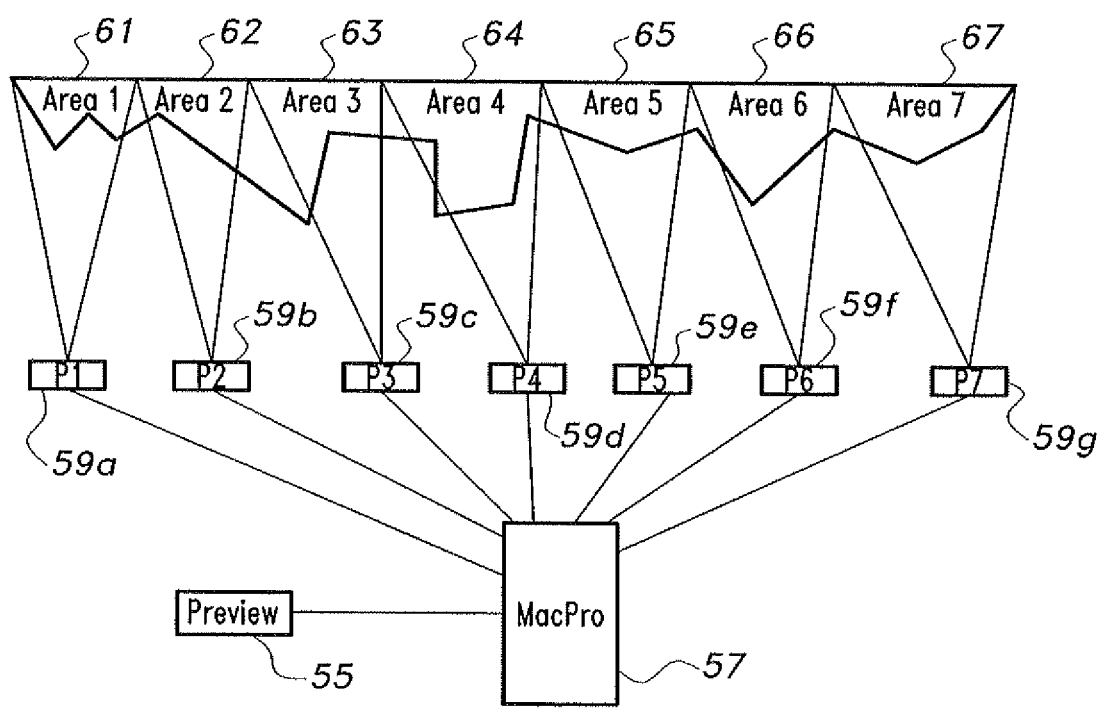
FIG. 2 is a block diagram showing the initial setup for white frame perspective transformation in a method for 3D visual mapping using 3D stereoscopic video content according to the present invention.

As shown in FIG. 2, mapping is created by using all white frames of video generated in MODUL8 software running on a computer 57, which are routed to projectors 59*a* through 59*g*, and adjusting the frame shapes using the perspective transform to create a view from the perspective desired by the designer as the video frames are projected onto the disparate areas 61 through 67. A preview function 55 is provided to preview the mapping results. Other options for mapping include reprogramming or scaling the paint module of MODUL8 software to draw around the area that the user needs masked.

Figure 3:
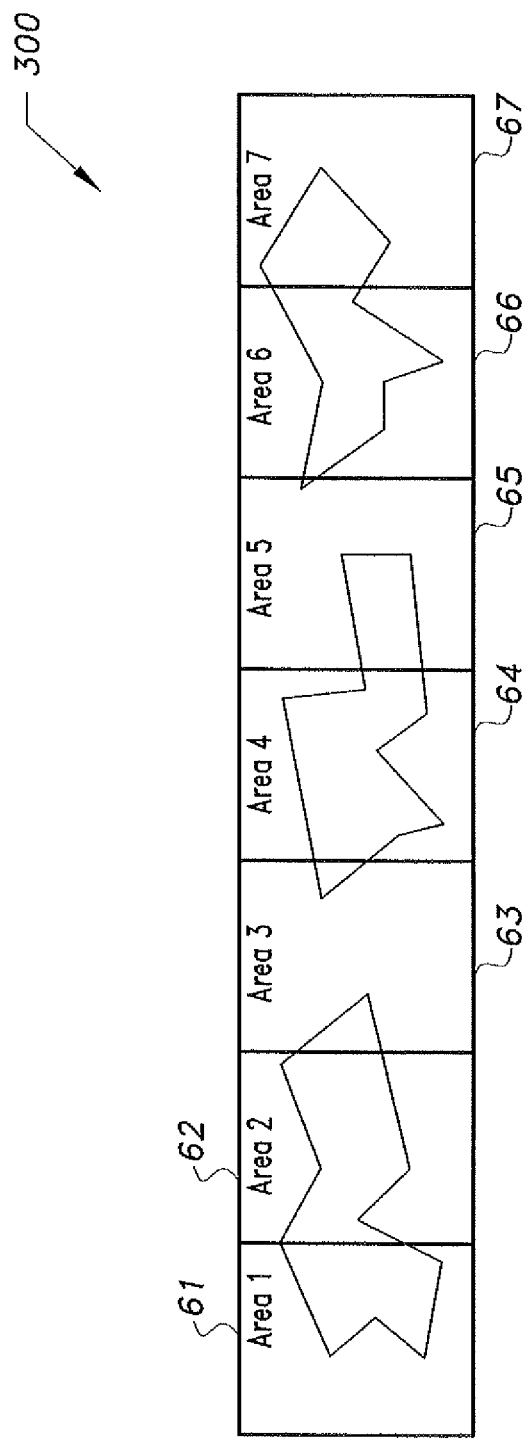
FIG. 3 is a pictorial diagram showing lockdown of a master mask in a method for 3D visual mapping using 3D stereoscopic video content according to the present invention.

A logical rendering of the 2D Master mask is most clearly shown in FIG. 3, Once all mapping is locked into place on the XY pixel grid provided by Modul8, then the entire project is logically recorded-rendered out of Modul8 and onto the hard drive at the total resolution equal to the sum of each projector's native resolution to produce a master mask 300. For example, referring to FIG. 3, if each projector's native resolution is 1440×1050, the resolution of the master 2D mask would be 10080×1050 (10080 pixels wide by 1050 pixels high).

Figure 4:
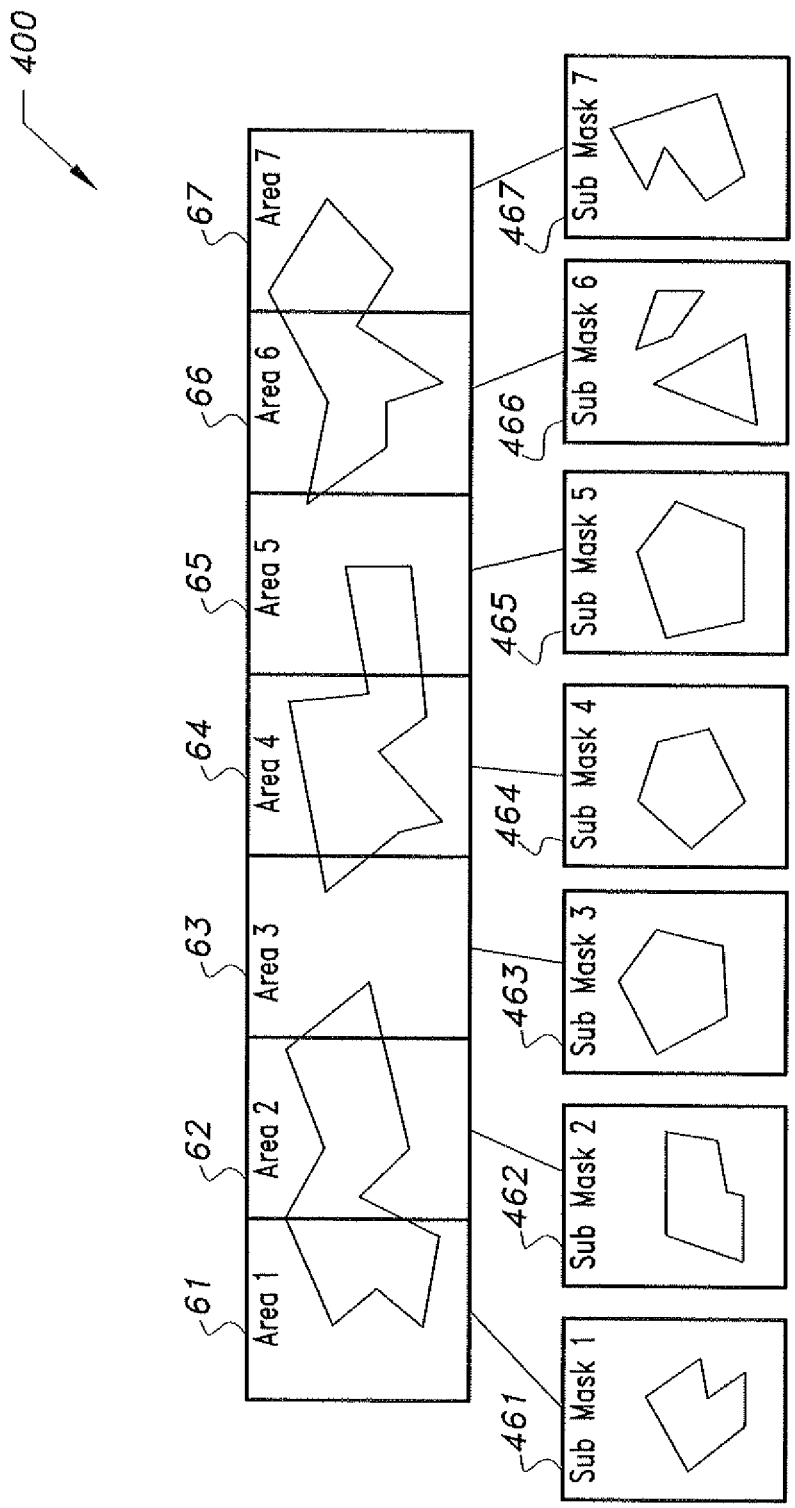
FIG. 4 is a pictorial diagram showing creation of the sub-masks in a method for 3D visual mapping using 3D stereoscopic video content according to the present invention.

The 2D master mask separation 400 is most clearly shown in FIG. 4. Adobe® After Effects® (AA) (After Effects® is a registered trademark, now owned by Adobe Systems Incorporated of San Jose, Calif.) is a digital motion graphics and compositing software published by Adobe Systems and is used in film and video post-production. Adobe After Effects supports 30,000×30,000 pixel dimensions, thereby allowing the file on the hard drive to be imported to AA and separated into individual screen sizes 461 through 467 associated with areas 61 through 67.

Figure 5:
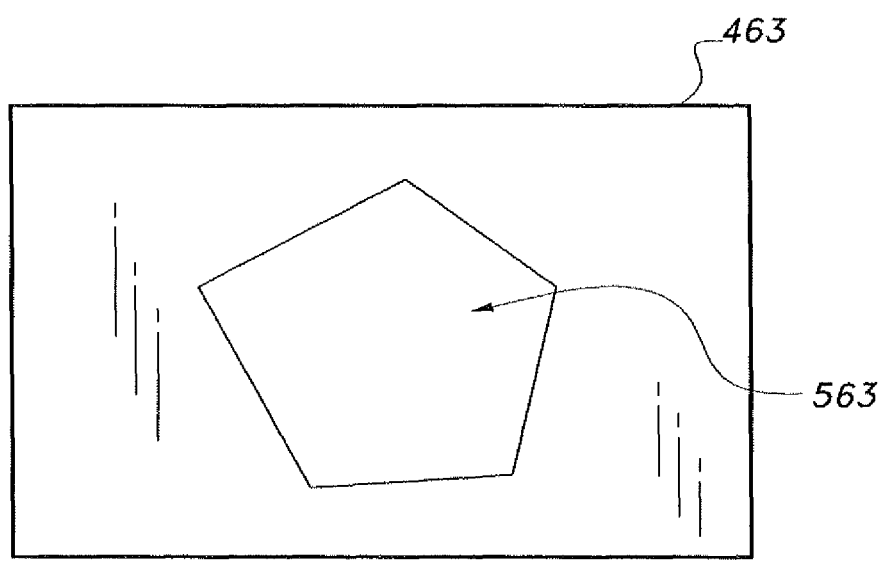
FIG. 5 is a pictorial diagram showing an individual sub-mask applied to individual 3D video content in a method for 3D visual mapping using 3D stereoscopic video content according to the present invention.

The relationship between sub-masks and areas, such as 2D sub-mask 463 and 3D area 563, is shown in FIG. 5. After each 2D sub-mask has been exported from AA, it will be brought into Final Cut Pro, where it will be applied as a video layer and used to mask the areas around the 3D Stereoscopic content in the timeline. Final Cut Pro is a non-linear editing software application developed by Macromedia Inc. and then Apple Inc. Final Cut Pro 7 runs on Mac personal computers powered by Mac OS X version 10,5.6 or later and using Intel processors. It is a module of the Final Cut Studio product. The software allows users to log and capture video onto a hard drive (internal or external), where it can be edited, processed, and output to a wide variety of formats.

Figure 6:
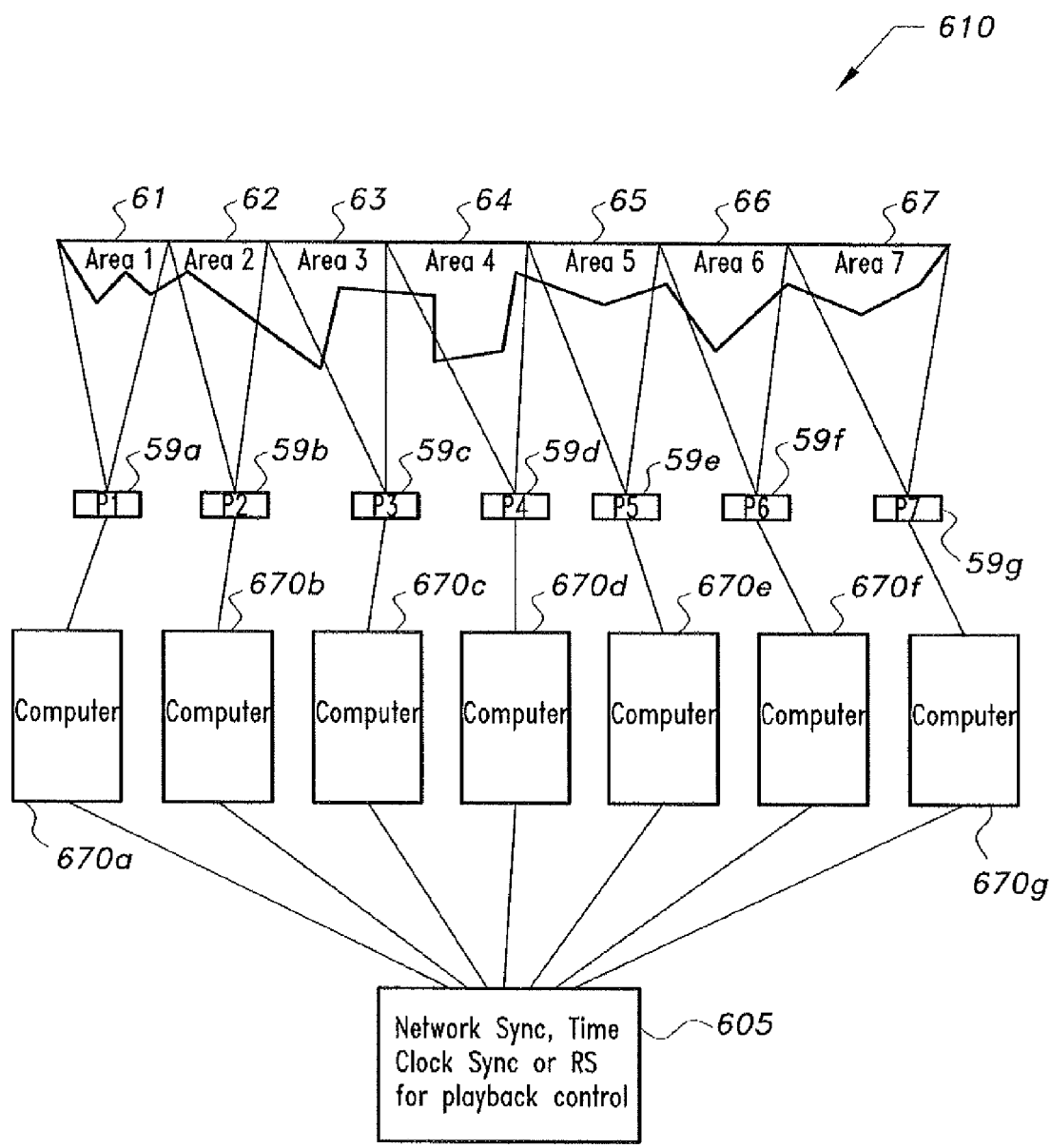
FIG. 6 is a diagram showing time-synchronized computers controlling projectors assigned to designated areas in a 90° arc for playback of the individually submasked 3D video content in a method for 3D visual mapping using 3D stereoscopic video content according to the present invention.

As shown in the top-down view of the 3D surface projection areas 610 (FIG. 6), the stereoscopic content is brought back to the projectors 59*a* through 59*g*, which are capable of also projecting stereoscopic images using circular polarization on a non-polarized surface using silver paint. However, due to Modul8 not being able to play back the desired frame rates of the stereoscopic information, an independent processor, such as processors 670*a* through 670*g*, must be used for each projector output.

Figure 7:
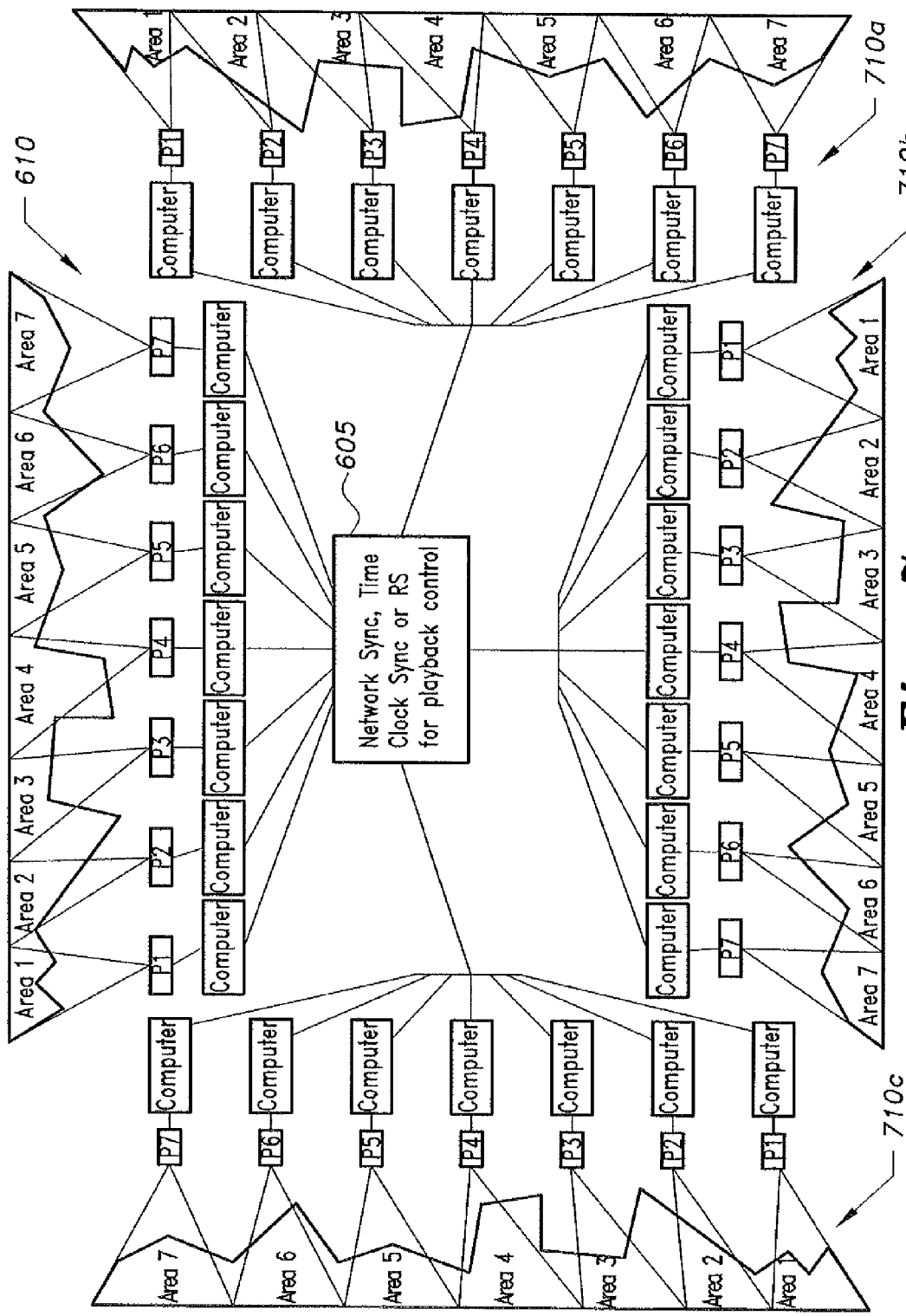
FIG. 7 is a diagram showing a plurality of time-synchronized computers controlling projectors assigned to designated areas in a 360° arc for playback of the individually submasked 3D video content in a method for 3D visual mapping using 3D stereoscopic video content according to the present invention.

Each of computers 670*a* through 670*g* is on a time clock or network synchronizer 605 to playback the files at the same time, thereby creating a seamless large image. In the top-down view shown in FIG. 7, the views are broken up into left, right, top, and bottom views. What is achieved is the ability to carefully map and place content to match existing or specially built architecture, moving outside of square shapes, and spheres, and into complex shapes. This entire process can be scaled up and down very rapidly. For example, instead of just one group of seven projection areas 610, there may be additional groups of projection areas such as right side group 710*a*, bottom group 710*b* and left side group 710*e*, all being time synchronized by network time synchronizer 605.

It is to be understood that the present invention is not limited to the embodiments described above, but encompasses any and all embodiments within the scope of the following claims.

I claim:

1. A method for 3D visual mapping using 3D stereoscopic video content, comprising the steps of:
    projecting a live-rendered 2D perspective white image, thereby producing a projected live-rendered 2D perspective white image;
    mapping the projected white image to a 3D object having a plurality of abstractly shaped surface areas, thereby creating a 2D perspective mask fitting the 3D object;
    locking the mapping into place on an XY pixel grid;
    logically recording-rendering the mapping onto a mass storage device at a native resolution, thereby producing a 2D master mask;
    separating the 2D master mask into 2D sub-masks determined by each individual abstract surface area of the plurality of surface areas of the 2D master mask;
    applying each of the 2D sub-masks as a video layer masking areas around a 3D stereoscopic video content in its own timeline, thereby creating a 2D masked-mapped stereoscopic 3D video content; and
    projecting the 2D masked-mapped stereoscopic 3D video content onto the plurality of abstractly shaped surface areas.

2. The method for 3D visual mapping according to claim 1, wherein said step of mapping the projected white image to a 3D object further comprises arranging a plurality of projectors one-on-one with respect to the abstractly shaped surfaces, each of the projectors covering one of the abstractly shaped surfaces.

3. The method for 3D visual mapping according to claim 2, wherein each said projector is controlled by a separate corresponding processor to project onto one of the originally defined 3D object surface areas.

4. The method for 3D visual mapping according to claim 3, further comprising the step of playing back synchronization of the 3D content on the abstractly shaped surface areas.

5. The method for 3D visual mapping according to claim 4, wherein a common clock originates from at least one computer to provide synchronization during the playing back step.

6. The method for 3D visual mapping according to claim 4, wherein a common clock originates from a separate network synchronization device distributing the common clock to at least one computer, the at least one computer passing time synchronization from the common clock through to at least one of the processors, the at least one of the processors forwarding the time synchronization to the video projector connected thereto.

7. The method for 3D visual mapping according to claim 4, further comprising the step of previewing the mapping to be displayed on a display device.

8. The method for 3D visual mapping according to claim 3, wherein a single computer is operably connected to many said processors.

9. The method for 3D visual mapping according to claim 3, wherein a single computer is operably connected to a corresponding single one of said processors.

* * * * *